(12) United States Patent
Meier et al.

(10) Patent No.: US 6,438,838 B1
(45) Date of Patent: Aug. 27, 2002

(54) METHOD FOR REPAIRING AND PRODUCING INTEGRALLY BLADED ROTORS FOR A TURBINE OR TURBO ENGINE

(75) Inventors: Reinhold Meier, Dorfen; Wilfried Schütte, Oberhaching; Mario Schmidt, Augsburg; Karel Mazac, Friedberg, all of (DE)

(73) Assignees: MTU Aero Engines GmbH, Munich; KUKA Schweissanlagen GmbH, Augsburg, both of (DE)

( * ) Notice: Subject to any disclaimer, the term of this patent is extended or adjusted under 35 U.S.C. 154(b) by 0 days.

(21) Appl. No.: 09/743,771
(22) PCT Filed: Jul. 15, 1999
(86) PCT No.: PCT/DE99/02163
§ 371 (c)(1),
(2), (4) Date: May 14, 2001
(87) PCT Pub. No.: WO00/03834
PCT Pub. Date: Jan. 27, 2000

(30) Foreign Application Priority Data

Jul. 15, 1998 (DE) .......................................... 198 31 736

(51) Int. Cl.[7] ................................................. B23P 15/00
(52) U.S. Cl. .................... 29/889.1; 29/889.21; 228/119
(58) Field of Search .............................. 29/889.1, 889, 29/889.22, 889.21, 428, 402.03, 402.08, 402.1, 402.13, 402.16; 228/119

(56) References Cited

U.S. PATENT DOCUMENTS

| 5,913,555 | A | * | 6/1999 | Richter et al. ........... 29/402.08 |
| 5,972,424 | A | * | 10/1999 | Draghi et al. .............. 29/889.1 |
| 6,095,402 | A | * | 8/2000 | Brownell et al. ........ 228/112.1 |
| 6,128,820 | A | * | 10/2000 | Nolan et al. ............. 29/402.13 |
| 6,154,959 | A | * | 12/2000 | Goodwater et al. ......... 228/119 |
| 6,155,789 | A | * | 12/2000 | Mannava et al. .......... 29/889.1 |
| 6,173,491 | B1 | * | 1/2001 | Goodwater et al. ........ 29/889.1 |

* cited by examiner

*Primary Examiner*—I Cuda-Rosenbaum
(74) *Attorney, Agent, or Firm*—Kenyon & Kenyon

(57) ABSTRACT

A method for repairing/manufacturing an integrally bladed rotor for a turbine or turbo engine, in which, in the case of a repair, at least one vane section to be replaced is removed leaving a stub section to which a replacement vane section is to be welded, and, in the case of manufacturing, a carrier to be provided with vanes has stubs projecting over its peripheral surface, to each of which a vane is to be welded, includes the steps of: arranging an inductor around the front face of the stub section or stub; positioning a replacement vane section or vane at a small radial distance from and aligned with the stub section or stub; and welding the replacement vane section or vane to the stub section or stub, respectively, in a protective gas atmosphere by exciting the inductor with high-frequency current and moving the opposing heated part surfaces together.

20 Claims, 2 Drawing Sheets

METHOD FOR REPAIRING AND PRODUCING INTEGRALLY BLADED ROTORS FOR A TURBINE OR TURBO ENGINE

FIELD OF THE INVENTION

The present invention relates to a method for repairing an integrally bladed rotor for a turbine or turbo engine, in which a plurality of projecting vanes are arranged on the peripheral surface of the carrier, and to a method for manufacturing an integrally bladed rotor for a turbine or turbo engine, in which a plurality of projecting vanes are to be arranged on a peripheral surface of a carrier, each of which is welded to a stub, having a front face, projecting over the peripheral surface.

BACKGROUND INFORMATION

Such integrally bladed rotors can be manufactured by milling from the entire unit or by welding the individual vanes to the carrier. U.S. Pat. No. 4,883,216 describes a method of repairing and manufacturing such a rotor in which initially a collar is welded to the stubs projecting over the peripheral surface of the carrier around its entire periphery and subsequently a (replacement) vane is welded to this enlarged bonding surface, made up of stub and collar, which has a considerably widened bonding collar on the vane base. One disadvantage is that the vane cannot be welded in its final/finished form, and a very large amount of subsequent machining is required due to the two collars.

French Patent Application No. 22 26 241 describes a method for bonding vanes to a rotor carrier. The vanes include a projecting base having a supporting surface for transmitting joining forces. The vanes are welded to the rotor carrier using resistance welding.

SUMMARY

One object of the present invention is to provide a method of repairing a rotor of a turbine or turbo engine in which the replacement vane section can be welded as far as possible in its finished form without many additional machining steps. It is another object of the present invention to provide a method of manufacturing such a rotor, in which the vanes can be welded to the carrier as far as possible in their finished form without many additional machining steps.

According one embodiment of the present invention, the repairing method includes the following steps: removing a vane section to be replaced leaving a stub section forming a first part of the vane, which has a front face for bonding to a replacement vane section; arranging an inductor around the front face of the stub section; positioning the replacement vane section, corresponding to the removed vane section in shape and size, on the stub section, one surface used as a joining surface of the replacement vane section and the front face of the stub section being essentially aligned with and opposite one another at a small distance; and welding the replacement vane section to the stub section in a protective gas atmosphere by exciting the inductor with high-frequency current and moving the replacement vane section and the stub section together, with the melted front face of the stub section and the surface of the replacement vane section in contact with one another.

One advantage of the repair method according to the present invention is that the induced high-frequency current is concentrated in the respective joining surfaces and these surfaces are only melted in the area near the surface, so that the replacement vane section and the stub section are pressed together using relatively little force and over an extremely short period of time. For this reason the replacement vane section can be easily held in the blade area.

Furthermore, particularly thin-walled, mechanically sensitive vanes can be replaced or attached in this way. It is also possible to join cast vanes to forged rotors (disks/rings) in manufacturing new units.

In one embodiment, the inductor is arranged at a greater distance from the joining surface in the vane front edge and rear edge areas than in the central area of the vane and the stub section, so the induced high-frequency electrical current heats the front face of the stub section and the surface of the replacement vane section as evenly as possible at all points, melting only the areas close to their respective surfaces.

The surface of the replacement vane section may be positioned at a distance of approximately 2 mm from the front face of the stub section prior to welding, so the front face of the stub section and the surface of the replacement vane section are evenly heated, melting only to a depth of approximately 0.1 mm.

The replacement vane section may be fitted into a plastic block in a non-slipping manner, so that the replacement vane section can be welded to the carrier in its final form without additional holding or supporting sections. In this manner, expensive machining steps no longer need to be performed on the replacement vane section.

The welding step may be performed in a maximum of 3 seconds, which guarantees an efficient process and ensures that the stub section and the replacement vane section melt in the areas of their respective surfaces. The replacement vane section and the stub section may be moved together a maximum of for example an additional 1 mm after contact of their surface and front face, so that any contaminants in the melt are pressed out at the sides, but the peripheral thickening of the joint is kept small.

In another embodiment, the vane blade section to be replaced, which is usually damaged, may be removed along a parting plane extending to the vane tip. In this manner, if only the vane tip area is damaged, only a small section of the vane has to be replaced, and not the entire vane.

The manufacturing method according to the present invention includes the following steps: arranging an inductor around the front face of the stub; positioning a vane on the stub, one surface of the vane and the front face of the stub being essentially aligned with and opposite one another at a small distance; and welding the vane to the stub in a protective gas atmosphere by exciting the inductor with high-frequency current and moving the vane and the stub together, with the melted front face of the stub and the surface of the vane in contact with one another.

DETAILED DESCRIPTION

Figure 1:
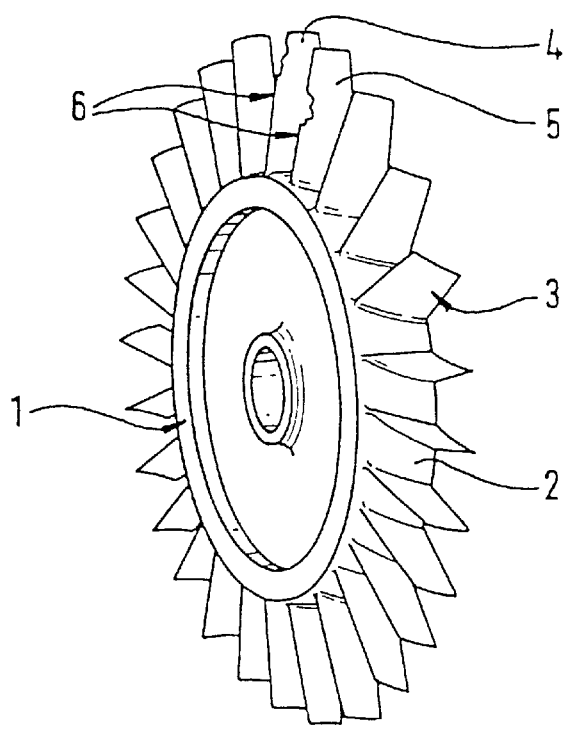
FIG. 1 shows a perspective view of a rotor having two damaged vanes.

FIG. 1 is a perspective view of the rotor for a turbine or turbo engine which has a carrier 1 designed as a disk, on whose peripheral surface 2 a plurality of vanes 3 are integrally arranged projecting outward. Vanes 3 are generally arranged equidistant on periphery 2 of carrier 1. In addition to a plurality of undamaged vanes 3, two vanes 4 and 5 are damaged in the area of their front edge 6.

Figure 2:
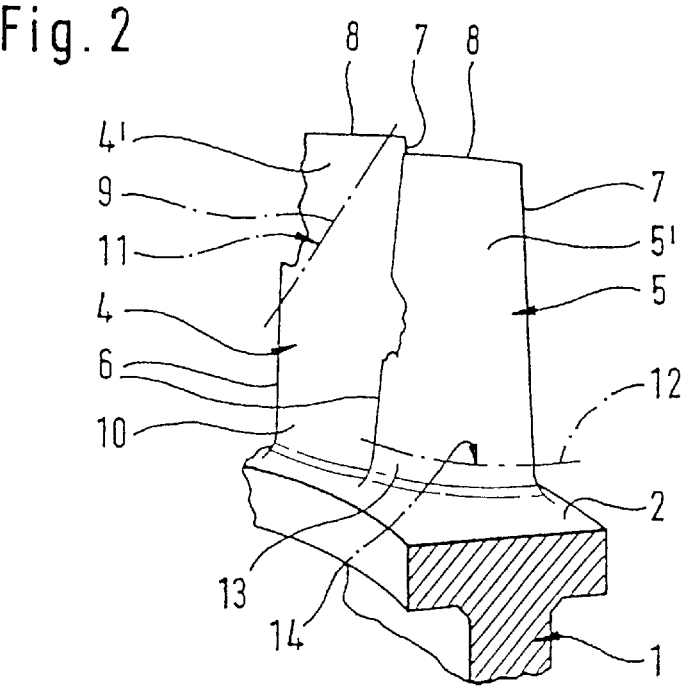
FIG. 2 shows an enlarged detail from FIG. 1.

As can be seen more clearly in the detail of FIG. 2, damage on vanes 4 and 5 appear on their front edge 6, while the opposite rear edge 7 is basically undamaged. The damage on vane 4 appears in an area near a vane tip 8, so that in one embodiment of the repair method according to the present invention, a vane blade section 4' is removed along a parting plane 9 and a stub section 10 forming a part of vane 4, i.e., of the vane blade, and having front face 11, is left unremoved. For damages such as the damage on vane 4, it is not necessary to separate and almost fully remove vane 4 or its blade.

The damage on vane 5 appeared in the direction of the stack axis in the central area between vane tip 8 and peripheral surface 2 of carrier 1. In such a case, according to another embodiment of the repair method according to the present invention, a vane section 5' of damaged vane 5 is almost fully removed along a parting plane 12, so that a stub 13 projecting approximately 2 to 3 mm over peripheral surface 2 of carrier 1 and having a front face 14 remains. While parting plane 9 of vane 4 extends obliquely to a cross-section surface up to vane tip 8, parting plane 12 of vane 5 extends substantially parallel to a cross-section surface of vane 5. Front faces 11 and 14 of vanes 4 and 5, respectively, need not necessarily be flat, but may have a curvature depending on the application.

Figure 3:
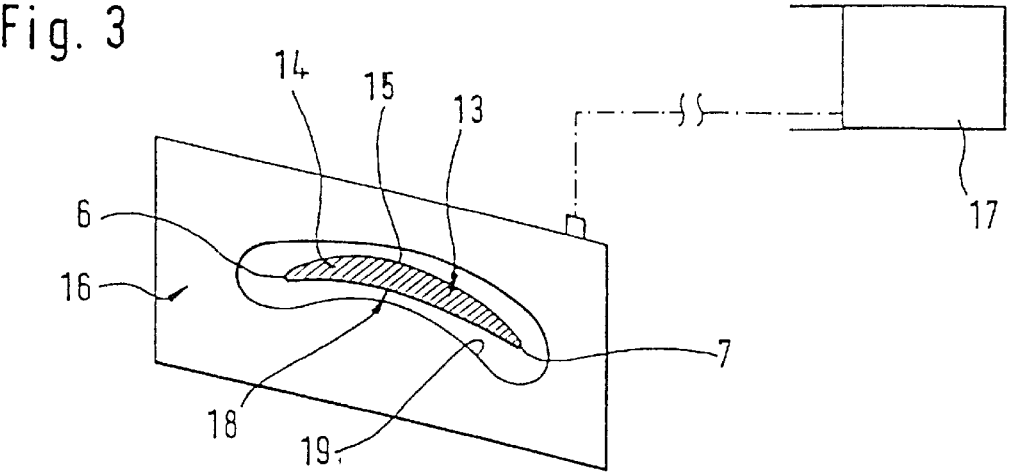
FIG. 3 is a schematic perspective view of a stub section with an inductor, connected to a current source, arranged around the stub section according to one embodiment of the method according to the present invention.

According to the next step of the repair method according to the present invention, an inductor 16 is arranged in the area of front face 14 of stub 13 around its periphery 15; The inductor is electrically connected to power source 17. As can be seen from the top view illustrated in FIG. 3, the distance between inductor 16 and stub 13 is greater in the area of front edge 6 and rear edge 7 of the vane than in central area 18 in order to achieve even heating of the joint formed by front face 14 of stub 13 during the subsequent welding step. The geometry of section 19 in which inductor 16 is located should be selected depending on the application, so that the material melts or softens only at the joint, i.e., front face 14 of stub 13, in order to allow quick welding and avoiding subsequent machining of the joint after welding.

Figure 4:
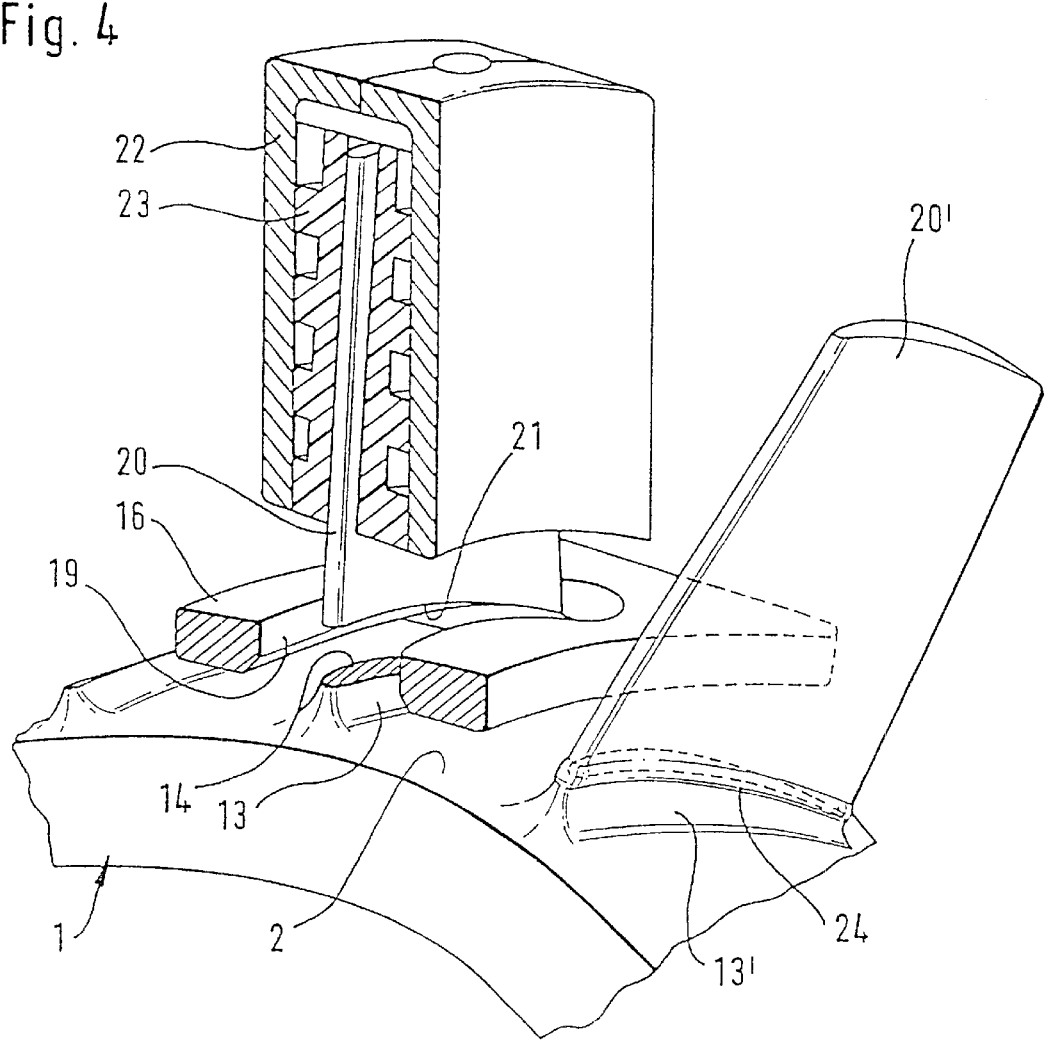
FIG. 4 is a perspective view partially in section of a vane blade section held by a (plastic) block.

FIG. 4 shows the next step of the repair method according to the present invention as a perspective drawing in which inductor 16 is arranged with its section 19 around periphery 15 of front face 14 of stub 13 which projects over peripheral surface 2 of carrier 1. A replacement vane 20 having surface 21 is securely held in a two-part cassette 22 in a plastic block 23. Cassette 22 is secured in a machine slide. Surface 21 of replacement vane 20 corresponds in shape and curvature to front face 14 of stub 13. In order to position replacement vane 20 for the subsequent welding step, the machine slide is moved so that surface 21 of replacement vane 20 is exactly aligned with and opposite front face 14 of stub 13. Before testing, replacement vane 20 may be moved to such front face 14 with its surface 21, then moving them at part again to a distance of approximately 2 mm from one another before the welding step that follows.

The subsequent welding takes place in a protective gas atmosphere. A high-frequency current is applied to inductor 16 for approximately 1 second. The application of the high-frequency current and thus heating is held as short as possible depending on the material used so that the material of stub 13 and of replacement vane 20 melts or becomes softened only in the area of the joint formed by front face 14 of stub 13 and surface 21 of replacement vane 20. After heating, surface 21 of replacement vane 20 is brought together with front face 14 of stub 13 to contact with one another, an upsetting course of approximately 1 mm being obtained as a result of the distance control. As an alternative, the parts may also be brought together using pressure control.

FIG. 4 shows a replacement vane 20', which is bonded to a stub 13' by high-frequency welding. In the area of joint 24 a slight thickening can be seen. The extent of this thickening depends, in addition to the upsetting course, on the material of stub 13, 13' and of replacement vane 20, 20' and it may require removal in a subsequent machining step. In many cases, the thickening at joint 24 is so small that it can be tolerated from the aerodynamic point of view, so that no subsequent machining is required.

If a vane section 4' is removed along a parting line 9 as illustrated in FIG. 2 in a repair procedure and the respective joint 24 is located in the area of the blade, subsequent machining of the blade surface may be required for aerodynamic reasons. Also the use of high-frequency current may be advantageous, because it is concentrated at front face 11 of stub section 10 and on the respective surface of replacement vane section 20, only melting the areas near the surface.

The manufacturing method differs from the above-described repair method only in that no damaged vane section need be initially removed, and stub 13 has the shape and size according to parting plane 12 illustrated in FIG. 2 instead.

What is claimed is:

1. A method for repairing an integrally bladed rotor for a turbine or turbo engine, the rotor including a plurality of projecting vanes arranged on a peripheral surface of a carrier, the method comprising the steps of:
   removing a vane section to be replaced so that a stub section of the vane section to be replaced remains, the stub section having a front face configured to be bonded to a replacement vane section;
   arranging an inductor around the front face of the stub section;
   positioning the replacement vane section corresponding to the removed vane section on the stub section, one surface of the replacement vane section and the front face of the stub section being substantially aligned with and opposite to each other at a small distance; and
   welding the replacement vane section to the stub section in a protective gas atmosphere by exciting the inductor with a high-frequency current and moving the replacement vane section and the stub section together to contact a softened to melted front face of the stub section and a softened to melted surface of the replacement vane section.

2. The method according to claim 1, wherein the replacement vane section positioned in the positioning step is substantially in a finished form.

3. The method according to claim 1, wherein in the inductor arranging step, the inductor is arranged at a distance from a welding joint formed in accordance with the welding step greater in a vane front edge area and a vane rear edge area than in a central area of the vane and the stub section.

4. The method according to claim 1, wherein in the replacement vane positioning step, the surface of the replacement vane section is positioned approximately 2 mm from the front face of the stub section.

5. The method according to claim 1, wherein the replacement vane section positioning step includes the substep of clamping the replacement vane section between two clamps in a non-slipping manner.

6. The method according to claim 1, wherein the replacement vane section positioning step includes the substep of fitting the replacement vane section into a plastic block in a non-slipping manner.

7. The method according to claim 1, wherein the welding step is performed in a maximum of approximately 3 seconds.

8. The method according to claim 1, wherein the replacement vane section and the stub section are moved together an additional distance of a maximum of approximately 1 mm after the contacting of the surface and the front face.

9. The method according to claim 1, wherein the vane section to be replaced is removed in the removing step along a parting plane extending to a vane tip.

10. The method according to claim 1, wherein the vane section is substantially completely removed in the removing step, the stub section projecting approximately 2.5 mm from the peripheral surface of the carrier.

11. A method for manufacturing an integrally bonded rotor for a turbine or turbo engine, the rotor including a plurality of projecting vanes arranged on a peripheral surface of a carrier, each vane being welded to a stub having a front face projecting over the peripheral surface, the method comprising the steps of:

arranging an inductor around the front face of the stub;

positioning a vane on the stub so that one surface of the vane and the front face of the stub are substantially aligned with and opposite to each other at a small distance; and welding the vane to the stub in a protective gas atmosphere by exciting the inductor with a high-frequency current and moving the vane and the stub together to contact a softened to melted front face of the stub and a softened to melted surface of the vane.

12. The method according to claim 11, wherein the vane positioned in the positioning step is substantially in a finished form.

13. The method according to claim 11, wherein the carrier includes a disk.

14. The method according to claim 11, wherein the carrier includes a ring.

15. The method according to claim 14, wherein the ring is formed of SiC fiber-reinforced titanium.

16. The method according to claim 11, wherein the vane is formed of titanium.

17. The method according to claim 11, wherein the vane is formed from one of cobalt and a nickel-based alloy.

18. The method according to claim 11, wherein the vane is hollow.

19. The method according to claim 11, wherein the inductor includes at least one disposable, inexpensively manufactured component.

20. The method according to claim 11, wherein the inductor is a single-use inductor.

* * * * *

UNITED STATES PATENT AND TRADEMARK OFFICE
CERTIFICATE OF CORRECTION

PATENT NO. : 6,438,838 B1
DATED : August 27, 2002
INVENTOR(S) : Meier et al.

It is certified that error appears in the above-identified patent and that said Letters Patent is hereby corrected as shown below:

Column 2,
Line 29, change "maximum of 3" to -- maximum of, for example, 3 --;
Line 34, change "of for example an" to -- of, for example, an --;
Line 55, change "shows" to -- is --;
Line 62, change "view partially in section" to -- view, partially in section, --;

Column 3,
Line 33, change "periphery 15; The" to -- periphery 15. The --; and

Column 4,
Line 22, change "Also the" to -- Also, the --.

Signed and Sealed this

First Day of July, 2003

JAMES E. ROGAN
*Director of the United States Patent and Trademark Office*